US009967385B2

United States Patent
Ishikawa et al.

(10) Patent No.: US 9,967,385 B2
(45) Date of Patent: May 8, 2018

(54) COMMUNICATION APPARATUS, COMMUNICATION CONTROL METHOD, AND NON-TRANSITORY COMPUTER-READABLE RECORDING MEDIUM

(71) Applicant: KYOCERA Corporation, Kyoto (JP)

(72) Inventors: Shuji Ishikawa, Yokohama (JP); Yasuhiro Ito, Tokyo (JP); Tomoya Kamijo, Yokohama (JP); Hidetaka Hayashi, Yokohama (JP); Kohei Michigami, Yokohama (JP); Kazuo Onishi, Yokohama (JP); Kazuya Chito, Machida (JP)

(73) Assignee: KYOCERA Corporation, Kyoto (JP)

( * ) Notice: Subject to any disclaimer, the term of this patent is extended or adjusted under 35 U.S.C. 154(b) by 0 days. days.

(21) Appl. No.: 15/422,719

(22) Filed: Feb. 2, 2017

(65) Prior Publication Data
US 2017/0230493 A1 Aug. 10, 2017

(30) Foreign Application Priority Data
Feb. 4, 2016 (JP) .................. 2016-019425

(51) Int. Cl.
*H04W 28/02* (2009.01)
*H04M 1/725* (2006.01)
(Continued)

(52) U.S. Cl.
CPC ...... *H04M 1/72519* (2013.01); *H04B 1/3816* (2013.01); *H04L 47/24* (2013.01);
(Continued)

(58) Field of Classification Search
CPC ....... H04W 12/04; H04W 12/06; H04W 4/24; H04W 76/02; H04W 84/12; H04W 8/183;
(Continued)

(56) References Cited

U.S. PATENT DOCUMENTS

| 2006/0129691 A1* | 6/2006 | Coffee ............... H04L 67/04 709/230 |
| 2006/0182055 A1* | 8/2006 | Coffee ............... H04L 67/04 370/328 |
| 2015/0312122 A1 | 10/2015 | Nakazawa |

FOREIGN PATENT DOCUMENTS

| JP | 2008-294713 A | 12/2008 |
| JP | 2015-162701 A | 9/2015 |
| JP | 2015-210663 A | 11/2015 |

OTHER PUBLICATIONS

An Office Action; "Notice of Reasons for Rejection," issued by the Japanese Patent Office dated Jul. 26, 2016, which corresponds to Japanese Patent Application No. 2016-019425 and is related to the present application; with English language Concise Explanation.

(Continued)

*Primary Examiner* — Diane Mizrahi
(74) *Attorney, Agent, or Firm* — Studebaker & Brackett PC

(57) ABSTRACT

The present application is directed to a communication apparatus, a communication control method and a non-transitory computer medium that enable a user to more effectively prohibit unauthorized communications. By way of example, a communication apparatus is disclosed that includes a controller provided with a Connectivity Manager function configured to perform data communication with a plurality of communication methods and select an optimal communication method. In various embodiments, the controller is configured to receive a request for data communication, and regulate the data communication, when the request is received while cellular communication is on, even when a unique user identifier (UID) of the request is a UID of the Connectivity Manager function, by preventing cellular communication by the Connectivity Manager function.

20 Claims, 12 Drawing Sheets

(51) Int. Cl.
| | |
|---|---|
| *H04B 1/3816* | (2015.01) |
| *H04L 29/08* | (2006.01) |
| *H04L 12/851* | (2013.01) |
| *G06F 9/44* | (2018.01) |

(52) U.S. Cl.
CPC ...... *H04L 67/322* (2013.01); *H04M 1/72577* (2013.01); *H04W 28/02* (2013.01); *G06F 9/4405* (2013.01); *H04M 1/72569* (2013.01)

(58) Field of Classification Search
CPC .......... H04M 15/751; H04M 15/7556; H04M 15/7655; H04M 15/773; H04M 17/026
See application file for complete search history.

(56) References Cited

OTHER PUBLICATIONS

An Office Action; "Final Reason for Rejection," issued by the Japanese Patent Office dated Oct. 11, 2016, which corresponds to Japanese Patent Application No. 2016-019425 and is related to the present application; with English language Concise Explanation.
Android Developers; "Connectivity Manager"; Jan. 13, 2016; URL: http://web.archive.org/web/20160113001238/http://developer.android.com/reference/android/net/ConnectivityManager.html.

\* cited by examiner

FIG. 9

| Communication method | ON / OFF |
|---|---|
| Cellular communication | ON |
| Wireless LAN | ON |
| BT | ON |
| Eth | OFF |

FIG. 10

| Communication method | Score |
|---|---|
| Cellular communication | 100 |
| Wireless LAN | 80 |
| BT | 60 |
| Eth | 0 |

COMMUNICATION APPARATUS, COMMUNICATION CONTROL METHOD, AND NON-TRANSITORY COMPUTER-READABLE RECORDING MEDIUM

CROSS-REFERENCE TO RELATED APPLICATIONS

This application claims priority to and the benefit of Japanese Patent Application No. 2016-019425 filed on Feb. 4, 2016, the entire contents of which are incorporated herein by reference.

TECHNICAL FIELD

This disclosure relates to a communication apparatus, a communication control method, and a non-transitory computer-readable recording medium.

BACKGROUND

Communication apparatuses such as mobile terminals that can perform data communication have been proposed. Many communication apparatuses are configured so that while data communication by applications running on the communication apparatus is permitted by default, data communication by applications selected by the user can be prohibited. In this case, for applications of which the user is aware, the user can suppress data communication by the applications. The user might not, however, be fully aware of what sort of applications are running on the communication apparatus. Accordingly, in a case where the user would choose to prohibit data communication if aware of operations by an application, the user might not choose to prohibit data communication of the application due to not being aware of the operations.

SUMMARY

A communication apparatus according to one of the embodiments of this disclosure includes:
a controller provided with a Connectivity Manager function configured to perform data communication with a plurality of communication methods and select an optimal communication method, wherein the controller is configured to
 receive a request for data communication; and
 regulate the data communication when the request is received while cellular communication is on, even if a UID of the request is a UID of the Connectivity Manager function.

A communication control method according to one of the embodiments of this disclosure includes:
 on a communication apparatus provided with a Connectivity Manager function configured to perform data communication with a plurality of communication methods and select an optimal communication method,
  receiving a request for data communication; and
  regulating the data communication when the request is received while cellular communication is on, even if a UID of the request is a UID of the Connectivity Manager function.

A non-transitory computer-readable recording medium according to one of the embodiments of this disclosure includes computer program instructions to be executed by a computer functioning as a communication apparatus, the communication apparatus provided with a Connectivity Manager function configured to perform data communication with a plurality of communication methods and select an optimal communication method,
 the instructions causing the computer to:
 receive a request for data communication; and
 regulate the data communication when the request is received while cellular communication is on, even if a UID of the request is a UID of the Connectivity Manager function.

BRIEF DESCRIPTION OF THE DRAWINGS

In the accompanying drawings:

FIG. 9 is an example of information, stored in the memory, pertaining to the ON/OFF status;

FIG. 10 is an example of information pertaining to the score of each communication method;

DETAILED DESCRIPTION

Embodiment 1

The following describes a communication apparatus according to one of the embodiments in detail with reference to the drawings. The communication apparatus according to this embodiment may be a mobile device, such as a mobile phone or a smartphone. The communication apparatus according to this embodiment, however, is not limited to being a mobile device and may be any of a variety of electronic devices that perform data communication, such as a desktop PC (Personal Computer), a notebook PC, a tablet PC, a household appliance, an industrial device (FA (Factory Automation) device), a dedicated terminal, or the like.

Apparatus Structure

Figure 1:
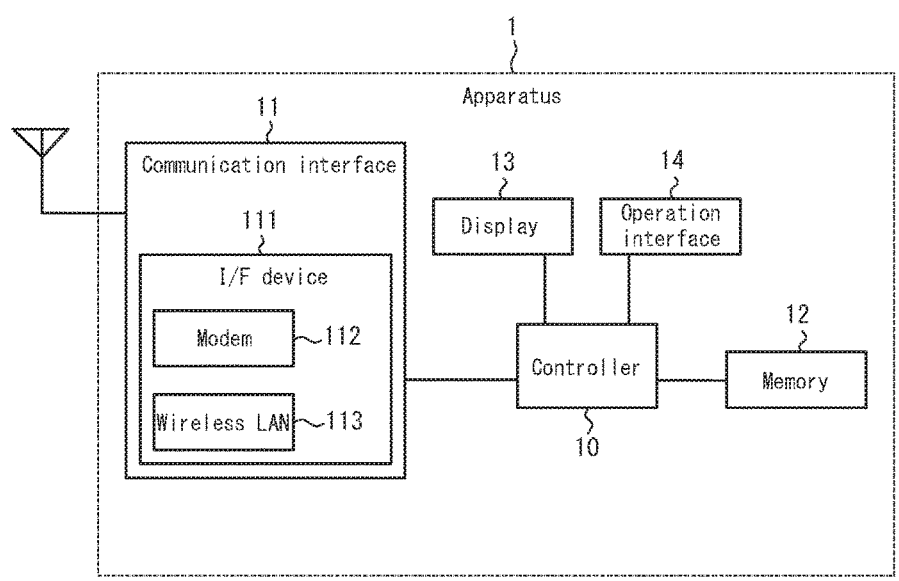
FIG. 1 is a functional block diagram schematically illustrating an example of the structure of a communication apparatus according to Embodiment 1.

FIG. 1 is a functional block diagram schematically illustrating an example of the structure of a communication apparatus 1 according to this embodiment. As illustrated in FIG. 1, the communication apparatus 1 includes a controller 10, a communication interface 11, a memory 12, a display 13, and an operation interface 14. The controller 10 is connected to and controls the communication interface 11, memory 12, display 13, and operation interface 14.

The controller 10 may be configured by a processor, microcomputer, or the like that can execute an operating system (OS) and application software (application). The OS may, for example, be Android® (Android is a registered trademark in Japan, other countries, or both). The application is described below.

The communication interface 11 is a communication interface that performs cellular communication, wireless LAN (Local Area Network) communication, or the like and is provided with an interface (I/F) device 111. The I/F device 111 includes a modem 112 and a wireless LAN device 113. The communication interface 11 is connected to a network such as the Internet using the I/F device 111 and performs data communication with the network. As a result, the communication apparatus 1 can perform data communication with the network. The communication interface 11 is connected to the controller 10 and acquires data to be output to the network from the controller 10. The controller 10 selects data to output to the communication interface 11 based on filtering. The filtering is described below. The controller 10 also acquires data received from the network from the communication interface 11.

When connecting to the network with a cellular communication method, a pay-as-you-go fee structure is typically adopted, with the communication fee increasing as the amount of transmitted data (packets) increases. On the other hand, when connecting to the network with a method such as wireless LAN communication, such a fee structure is not typical.

The memory 12 may, for example, be configured by a semiconductor memory. A variety of information or data, along with programs for applications, the OS, and the like executed by the controller 10, are stored in the memory 12. The controller 10 acquires and executes programs stored in the memory 12. The controller 10 stores data generated by executing the programs in the memory 12. The memory 12 may also function as a working memory.

The display 13 displays characters, images, objects for operation, pointers, and the like based on information acquired from the controller 10. The display 13 may, for example, be a display device such as a liquid crystal display, an organic EL (Electroluminescence) display, an inorganic EL display, or the like, but is not limited to these examples.

The operation interface 14 may be configured by physical keys such as numeric keys, a touchpad, a touch panel, or the like. In accordance with the content of input acquired from the operation interface 14, the controller 10 performs actions such as moving the pointer or the like displayed on the display 13 and selecting an object for operation.

Figure 2:
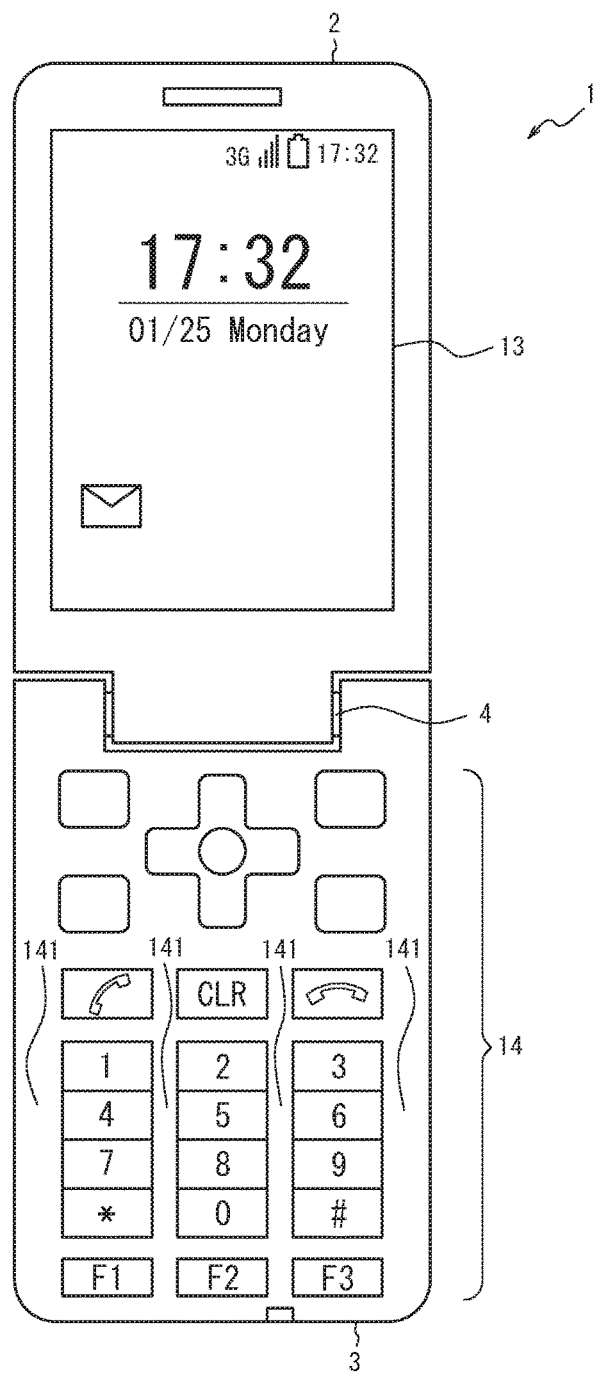
FIG. 2 is an external view of an example of the communication apparatus according to Embodiment 1.

FIG. 2 is an external view of an example of the communication apparatus 1 according to this embodiment. As illustrated in FIG. 2, the communication apparatus 1 according to this embodiment is a folding feature phone (flip phone, clamshell phone, or the like). In the communication apparatus 1, an upper housing 2 and a lower housing 3 are connected by a hinge 4 so as to be rotatable. The upper housing 2 is provided with the display 13, and the lower housing 3 is provided with the operation interface 14. The operation interface 14 is provided with physical keys, such as numeric keys, and with a touchpad 141 at a location where no physical key is provided. The communication apparatus 1 for example receives a selection operation on an object for operation using a physical key or receives a movement operation of a pointer or the like using the touchpad 141.

Applications

Applications are installed on the communication apparatus 1 and stored in the memory 12 so as to be executable by the controller 10. When the applications are installed on the communication apparatus 1, a unique user identifier (hereinafter, also abbreviated as UID) is allocated to each application. Each application is executed by the controller 10 as a process associated with a UID on the OS.

When executed by the controller 10, an application accesses resources such as the file system. If each application were to access resources without restriction, the resource areas used by the applications would overlap, which might prevent the applications from executing properly. Therefore, access to resources is restricted by the UIDs associated with processes running on the OS, so that applications do not affect each other with their use of resources. In other words, the resources that can be accessed by each process are restricted to resources of the process associated with the same UID.

Each application may further be allocated a group identifier (hereinafter, also abbreviated as GID or group ID). The GID identifies the group to which the unique UID allocated to each application belongs. One UID alone may belong to one group, or a plurality of UIDs may belong to one group. When an application is executed as a process associated with a UID, the process may also be associated with a GID. The restricted resources that can be accessed by each process may be broadened to include not only resources of the process associated with the same UID, but also resources of processes associated with the same GID.

Applications are executed in the foreground or the background. A state in which an application is executed in the foreground is, for example, a state in which the execution status is displayed on the display 13 to allow user confirmation, or a state in which the user can perform operations with the operation interface 14. A state in which an application is executed in the background is, for example, a state in which the execution status is not displayed on the display 13 and the user cannot perform operations, or a state in which the application is running without intent by the user.

Control of Data Communication

The applications executed by the controller 10 perform data communication with a network, such as the Internet, using the communication interface 11. As described above, the applications are each executed as a process associated with a UID on the OS. The UID is associated with the data transmitted by the application. By determining whether to permit or prohibit (restrict) transmission of data based on the UID associated with the data, the controller 10 can control whether to permit or prohibit data communication for the data transmitted by each application. As a general rule, in the following explanation of this embodiment, data communication refers to data communication between the communication interface 11 and the network.

Figure 3:
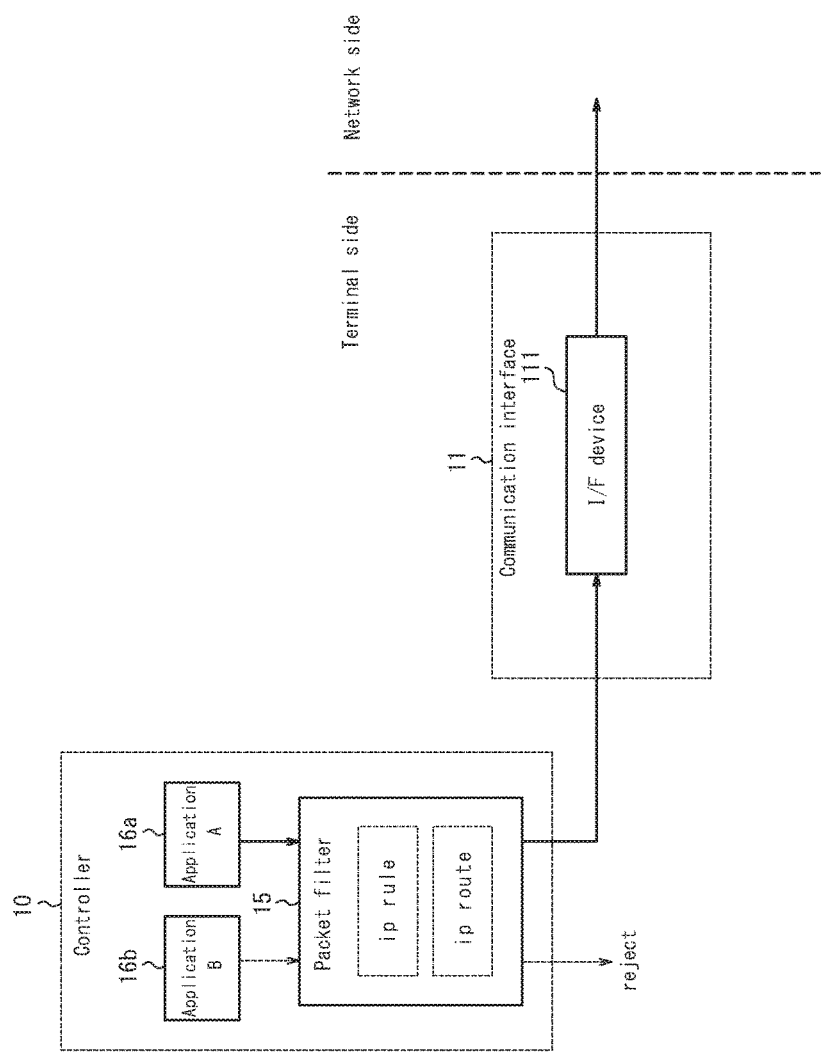
FIG. 3 is a block diagram illustrating an example of the flow of data according to Embodiment 1.

FIG. 3 is a block diagram illustrating an example of the flow of data according to this embodiment. In FIG. 3, the controller 10 and the communication interface 11 are provided on the terminal side. The communication interface 11 is connected to the network and performs data communication with the network.

In FIG. 3, the controller 10 executes an application A 16a and an application B 16b as processes on the OS. The applications executed by the controller 10 request data communication with the network as necessary. Requesting data communication is also referred to as issuing a request of data communication. For example, the application A 16*a* requests data transmission to the network. In this case, the data to transmit from the application A 16*a* to the network are input into a packet filter 15 operating in the controller 10. Similarly, data to transmit from the application B 16*b* to the network are input into the packet filter 15 from the application B 16*b*.

The packet filter 15 filters data from the controller 10 to the network. The filtering is processing to determine whether to permit or prohibit transmission of data requested by an application based on set filtering conditions. The filtering conditions for example include an ip_rule or an ip_route. These filtering conditions are stored in the memory 12 and referred to by the packet filter 15. Hereinafter, operations to set the filtering conditions are assumed to include operations to store the filtering conditions in the memory 12. The filtering conditions may be held in the controller 10 without being stored in the memory 12.

The ip_rule for example includes a condition for determining whether to transmit data whose source is X to the network. The ip_route for example includes a condition for determining the route (relay router or the like) for transmitting data for which the destination is designated as Y to the network.

In FIG. 3, the flow of data transmitted from the application A 16*a* is indicated by a solid arrow, whereas the flow of data transmitted from the application B 16*b* is indicated by a dashed arrow. Of these two, the data transmitted from the application A 16*a* are transmitted to the communication interface 11 without transmission being prohibited by the filtering in the packet filter 15. On the other hand, the data transmitted from the application B 16*b* are prohibited by the filtering in the packet filter 15 and are not transmitted to the communication interface 11. This operation is indicated by the dashed arrow in FIG. 3 pointing towards the word "reject".

The data that pass through the packet filter 15 (in the case of FIG. 3, the data transmitted from the application A 16*a* as indicated by the solid arrow) are input into the communication interface 11. The communication interface 11 transmits the data to the network using the I/F device 111. When transmitting the data to the network, the communication interface 11 may use cellular communication by the modem 112, wireless LAN communication by the wireless LAN device 113, or another communication method.

Filtering

It is determined whether to permit or prohibit data communication for data transmitted from an application based on the UID allocated to the application that is the source of data transmission. Hereinafter, data that are transmitted from an application to which X is allocated as the UID (hereinafter, also referred to as application with a UID of X) are also referred to as data with a UID of X. The filtering condition used to filter data with a UID of X is also referred to as the filtering condition for data with a UID of X.

The packet filter 15 for example has a filtering condition that only allows data communication for data transmitted from an application with a UID of 1. The filtering condition may also be a combination of a plurality of conditions.

The following describes the sequence for data communication when filtering according to this embodiment is performed. The filtering according to this embodiment is assumed to determine whether to permit or prohibit data communication for data transmitted by an application running in the background. The following description of filtering according to this embodiment is based on this assumption.

The filtering according to this embodiment has a set filtering condition such that data communication is prohibited by default (hereinafter, also referred to as default condition to prohibit communication). By the default condition to prohibit communication being set, all data communication is prohibited unless another filtering condition is further set. The default condition to prohibit communication may be set when the communication apparatus 1 is shipped or when the communication apparatus 1 is initialized. In other words, in this embodiment, the "default" refers to the standard operation that is set in advance at a predetermined time (for example, when the communication apparatus 1 is shipped, when the communication apparatus 1 is initialized, or the like).

In the filtering conditions used in this embodiment, in order to perform necessary data communication, a condition to permit data communication (hereinafter, also referred to as condition to permit communication) is set in addition to the default condition to prohibit communication. In this case, the condition to permit communication takes priority over the default condition to prohibit communication.

Figure 4:
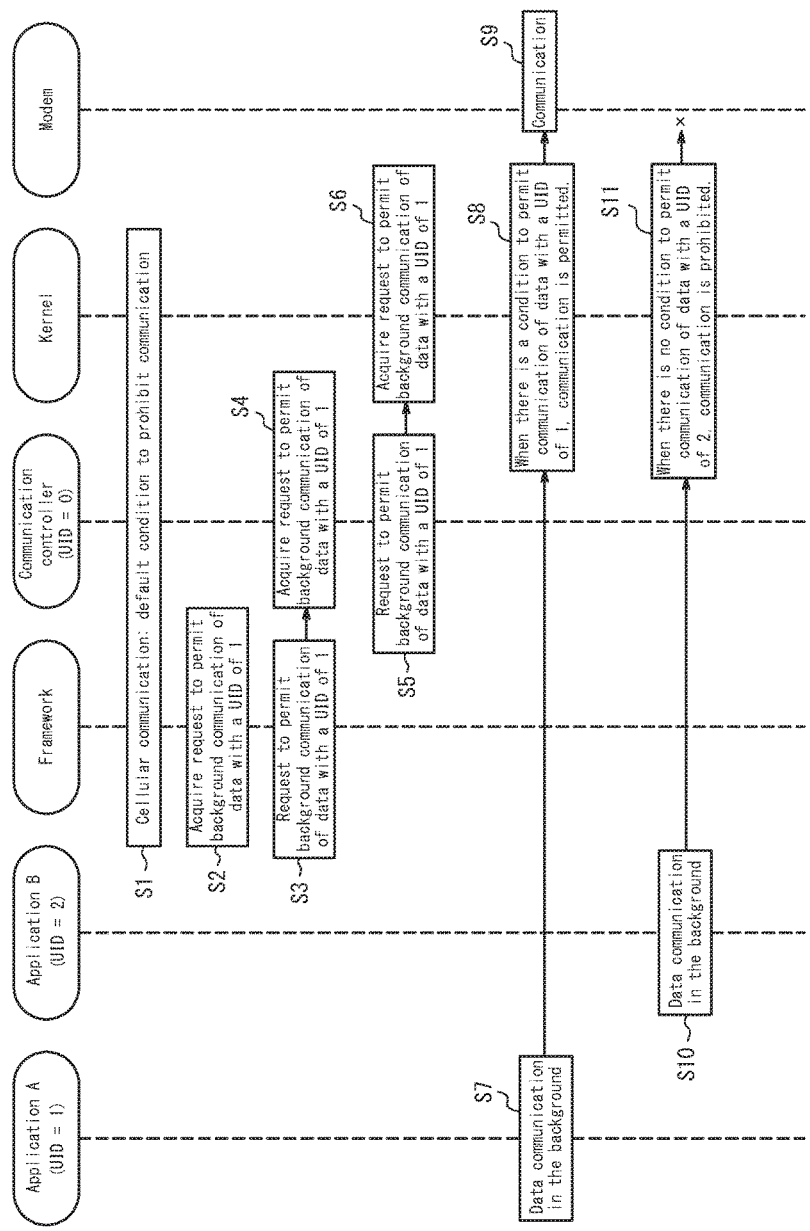
FIG. 4 illustrates the sequence of filtering according to Embodiment 1.

FIG. 4 illustrates the sequence of filtering according to this embodiment. FIG. 4 illustrates the sequence for the application A 16*a*, application B 16*b*, framework, communication controller, kernel, and modem 112.

As described above, the modem 112 is hardware that functions as a communication interface to perform cellular communication. In FIG. 4, data communication by cellular communication using the modem 112 is described, but the modem 112 may be replaced by another I/F device 111, such as the wireless LAN device 113, and data communication may be performed by another communication method.

The kernel, communication controller, and framework are software executed by the controller 10. In FIG. 4, the communication controller is allocated a UID of 0.

The framework is software that includes a functional group for causing applications to operate on the OS. In general, by combining portions of the functional group prepared on the framework, the functions of each application can be implemented.

The kernel is software that forms the nucleus of the OS. Based on processing of the applications and other software, the kernel manages processing on the communication interface 11 and other hardware to allow use of the hardware functions.

The communication controller is a daemon program that executes network related processing and executes processing that connects the framework and the kernel. In particular, the communication controller processes data to allow the kernel to use the functions of the communication interface 11. In this embodiment, the communication controller outputs, to the kernel, conditions for the kernel to determine whether to permit or prohibit data output to the communication interface 11.

In this embodiment, the filtering is described as being performed by the packet filter 15. The packet filter 15 is a virtual processing unit, and the actual filtering is performed by the communication controller and the kernel.

The application A 16*a* and the application B 16*b* are processes running on the OS. In FIG. 4, a UID of 1 is allocated to the application A 16*a*, and a UID of 2 is allocated to the application B 16*b*.

The following describes the sequence illustrated in FIG. 4. In the case of data transmission by an application running in the background, data communication by cellular communication is prohibited by default (step S1). In other words, as a filtering condition, a default condition to prohibit communication is set for data transmitted from an application running in the background. In FIG. 4, the kernel, communication controller, and framework recognize that the default condition to prohibit communication is set. In particular, when the kernel recognizes that the default condition to prohibit communication is set, data are not transmitted to the modem 112.

Next, the framework acquires a request to permit data communication for data with a UID of 1 in the case of an application running in the background (hereinafter, also referred to as request to permit communication of data with a UID of 1) (step S2). The framework then outputs the request to permit communication of data with a UID of 1 to the communication controller (step S3).

The communication controller acquires the request to permit communication of data with a UID of 1 (step S4). Next, the communication controller outputs the request to permit communication of data with a UID of 1 to the kernel (step S5).

The kernel acquires the request to permit communication of data with a UID of 1 (step S6). With the above operations in steps S3 to S6, the request to permit communication of data with a UID of 1 is conveyed to the kernel. In other words, as a filtering condition, a condition to permit communication for data with a UID of 1 is set.

Next, when the application A 16a issues a request for data communication while running in the background (step S7), the kernel permits the data communication, since the kernel recognizes that the condition to permit communication for data with a UID of 1 is set (step S8). The modem 112 then performs data communication to transmit the data with a UID of 1 to the network (step S9).

Conversely, when the application B 16b allocated a UID of 2 requests data communication while running in the background (step S10), the kernel recognizes that a condition to permit communication for data with a UID of 2 is not set. Therefore, the kernel prohibits data communication based on the default condition to prohibit communication (step S11).

Sequence of Data Transmission from an Application

Figure 5:
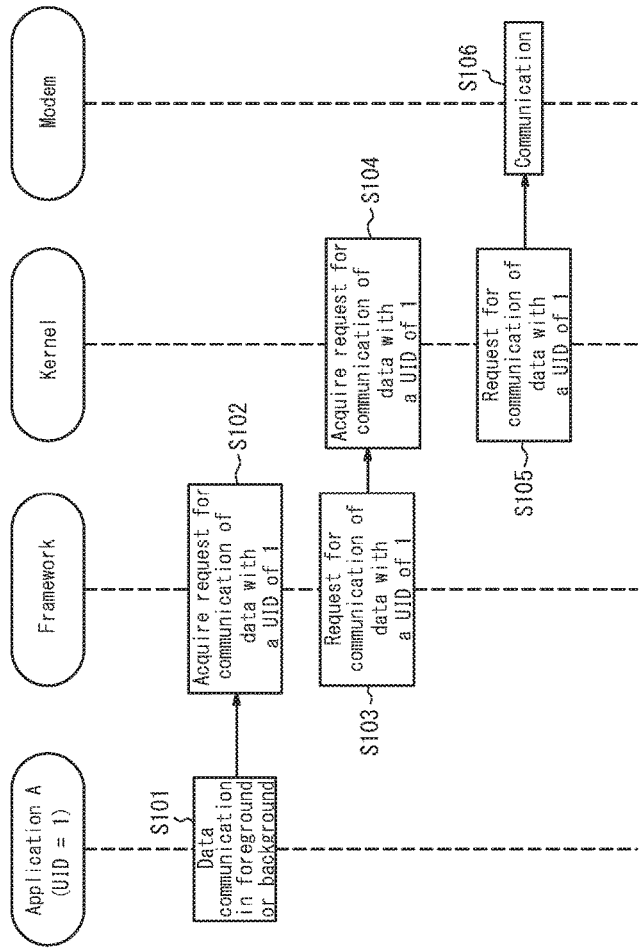
FIG. 5 illustrates an example of a sequence for transmitting data from an application.

In steps S7 to S9 of FIG. 4, the case of an application requesting data communication and the modem 112 performing data communication has been described. With reference to FIG. 5, the following describes this sequence in greater detail. FIG. 5 illustrates the sequence for the application A 16a, framework, kernel, and modem 112. A description of the application A 16a, framework, kernel, and modem 112 is the same as in FIG. 4 and is therefore omitted.

Whether running in the foreground or the background, the application A 16a outputs a request, to the framework on the OS on which the application A 16a is running, for data communication of data (data with a UID of 1) transmitted from the application A 16a (hereinafter, also referred to as request for communication of data with a UID of 1) (step S101).

The framework acquires the request for communication of data with a UID of 1 (step S102). Next, the framework outputs the request for communication of data with a UID of 1 to the kernel (step S103).

The kernel acquires the request for communication of data with a UID of 1 (step S104). Next, the kernel outputs data based on the request for communication of data with a UID of 1 to the modem 112 (step S105). The modem 112 then performs data communication to transmit the data with a UID of 1 to the network (step S106).

With the operations of the sequence illustrated in FIG. 5 as described above, data transmitted from the application are output to the communication interface 11 and are transmitted to the network.

Comparative Example

With the filtering according to the embodiment described thus far, in addition to the default condition to prohibit communication, a condition to permit communication is explicitly added by the user. Therefore, data communication not intended by the user is more likely to be prohibited. The following describes filtering according to a Comparative Example of this embodiment. The filtering conditions used in the filtering according to the Comparative Example include a condition to permit data communication for all data by default (hereinafter, also referred to as default condition to permit communication). In addition to permitting data communication for all data in this way, a condition to prohibit data communication for data with a UID designated by the user (condition to prohibit communication) is further set.

Figure 6:
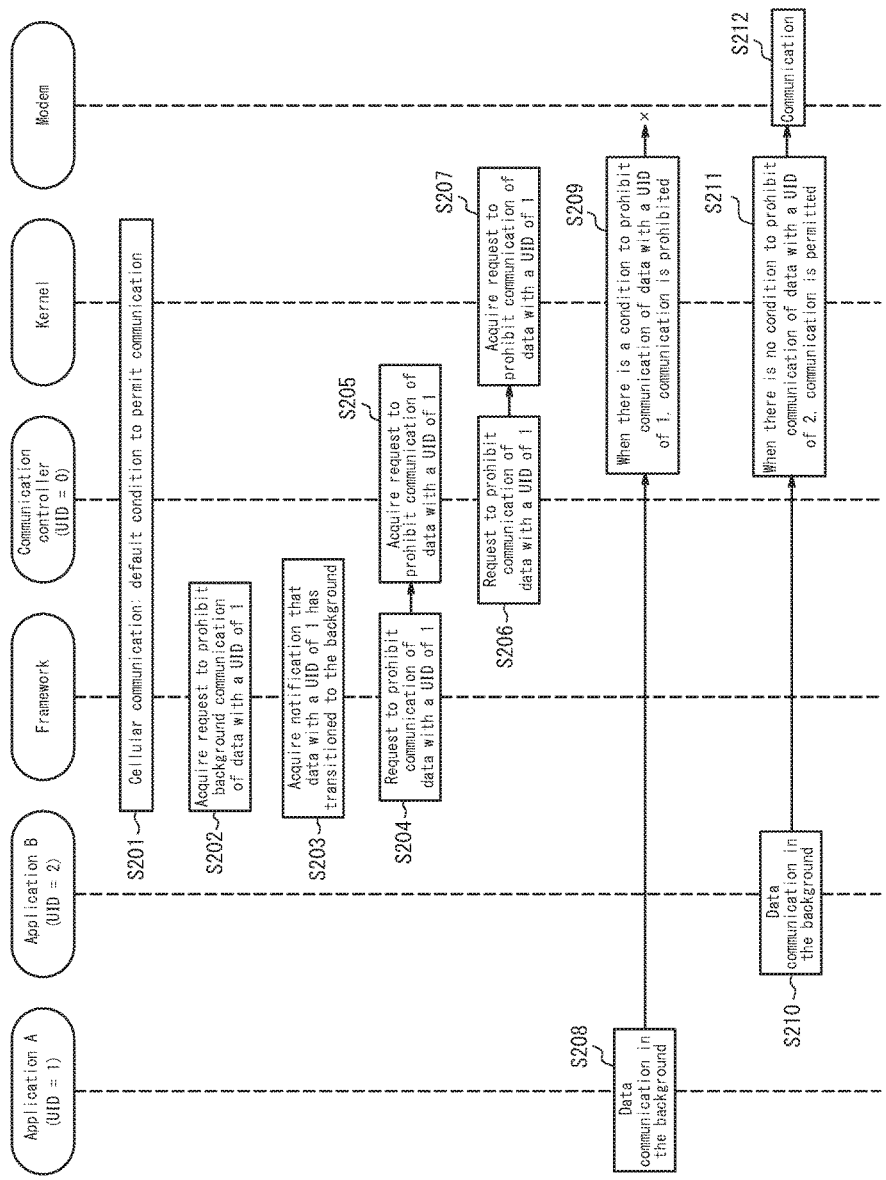
FIG. 6 illustrates the sequence of filtering according to a Comparative Example of Embodiment 1.

FIG. 6 illustrates the sequence of filtering according to a Comparative Example. A description of the application A 16a, application B 16b, framework, communication controller, kernel, and modem 112 is the same as in FIG. 4 and FIG. 5 and is therefore omitted.

In FIG. 6, even when an application running in the background transmits data, data communication by cellular communication is permitted by default (step S201). In other words, as a filtering condition, a default condition to permit communication is set for data transmitted from an application running in the background.

Next, the framework acquires a request to prohibit data communication for data with a UID of 1 in the case of the application A 16a running in the background (hereinafter, also referred to as request to prohibit communication of data with a UID of 1) (step S202). At this point in time, the application A 16a is not running in the background, and therefore the condition to prohibit communication for data with a UID of 1 is not set.

Next, the framework acquires notification that the application A 16a has transitioned to running in the background (background transition notification) (step S203). After receiving the notification, the framework outputs the request to prohibit communication of data with a UID of 1 to the communication controller (step S204).

The communication controller acquires the request to prohibit communication of data with a UID of 1 (step S205). Next, the communication controller outputs the request to prohibit communication of data with a UID of 1 to the kernel (step S206).

The kernel acquires the request to prohibit communication of data with a UID of 1 (step S207). With the above operations in steps S202 to S207, the request to prohibit communication of data with a UID of 1 is conveyed to the kernel. In other words, as a filtering condition, a condition to prohibit communication for data with a UID of 1 is set.

Next, when the application A 16a issues a request for data communication while running in the background (step S208), the kernel prohibits the data communication, since the kernel recognizes that the condition to prohibit communication for data with a UID of 1 is set (step S209).

Conversely, when the application B 16b allocated a UID of 2 requests data communication while running in the background (step S210), the kernel recognizes that a condition to prohibit communication for data with a UID of 2 is not set. Accordingly, based on the default condition to permit communication, the kernel permits data communication (step S211). The modem 112 then performs data communication to transmit the data with a UID of 2 to the network (step S212).

Filtering according to a Comparative Example has been described above. In the Comparative Example, the default condition to permit communication is set. Therefore, data communication is permitted for background operation of the application B 16b, for which the user has not explicitly set an additional filtering condition. Accordingly, when the user is not aware of the operations of the application B 16b, data communication not intended by the user may be performed.

Conversely, in this embodiment, the default condition to prohibit communication is set as a filtering condition. On top of this default condition, a condition to permit communication for data with a UID designated by the user is further set. In this case, by prohibiting data communication for all data by default, data communication not intended by the user is more likely to be prohibited.

Filtering according to this embodiment and a Comparative Example has been described above. In the filtering according to this embodiment, data communication is prohibited for all data by default, unlike the filtering according to the Comparative Example. A condition to permit communication for data with a UID designated by the user is then explicitly set by the user as a filtering condition, thereby allowing data communication intended by the user.

With the filtering according to this embodiment having the above-described configuration, data communication for data transmitted from the application B 16b, for which a filtering condition has not been explicitly set by the user, can be prohibited. In other words, the probability of prohibiting data communication that is not intended by the user increases.

In this embodiment, a method for prohibiting data communication via a cellular communication method using the modem 112 as the I/F device 111 has mainly been described. The I/F device 111 is not limited to the modem 112, however, and may be the wireless LAN device 113 or the like. In other words, the control method for data communication of the communication apparatus 1 according to this embodiment is not limited to data communication with a cellular communication method and may also be applied to data communication with another communication method, such as a wireless LAN communication method.

In this embodiment, data communication may be permitted by default for functions that are necessary to transmit the data for which data communication is permitted. The functions for which data communication is permitted by default may, for example, be a tunneling function of a Virtual Private Network (VPN), a name resolving function of a Domain Name System (DNS), or a tethering function. Permission for data communication related to these functions may be restricted to operations intended by the user. The condition for permitting data communication for these functions may be set as a filtering condition that takes priority over the default condition to prohibit communication.

The filtering according to this embodiment is performed for data communication of an application running in the background, but filtering is not limited to this case and may be performed for data communication of an application running in the foreground. In other words, the filtering according to this embodiment may determine whether to permit or prohibit data communication for data transmitted by an application running in the foreground.

Embodiment 2

The following describes Embodiment 2 of this disclosure. Overall, Embodiment 2 regulates communication related to a Connectivity Manager function on the Android® platform.

The Connectivity Manager function is a function to switch automatically to the optimal communication method among a plurality of communication methods (cellular communication, wireless LAN communication, Bluetooth® (hereinafter, also abbreviated as BT), and Ethernet® (hereinafter, also abbreviated as Eth) (Bluetooth and Ethernet are each a registered trademark in Japan, other countries, or both)) each time the communication status of the communication apparatus changes. With the Connectivity Manager function, the communication apparatus can communicate automatically using a communication method with good communication quality, without the user being particularly aware.

When automatically switching the communication method by the Connectivity Manager function, the communication apparatus communicates using the modem for scoring of the cellular communication. Operating the Connectivity Manager function each time the communication status with regard to external communication changes, however, leads to an increase in the volume of communication not intended by the user. Therefore, in Embodiment 2, this communication is suppressed.

Figure 7:
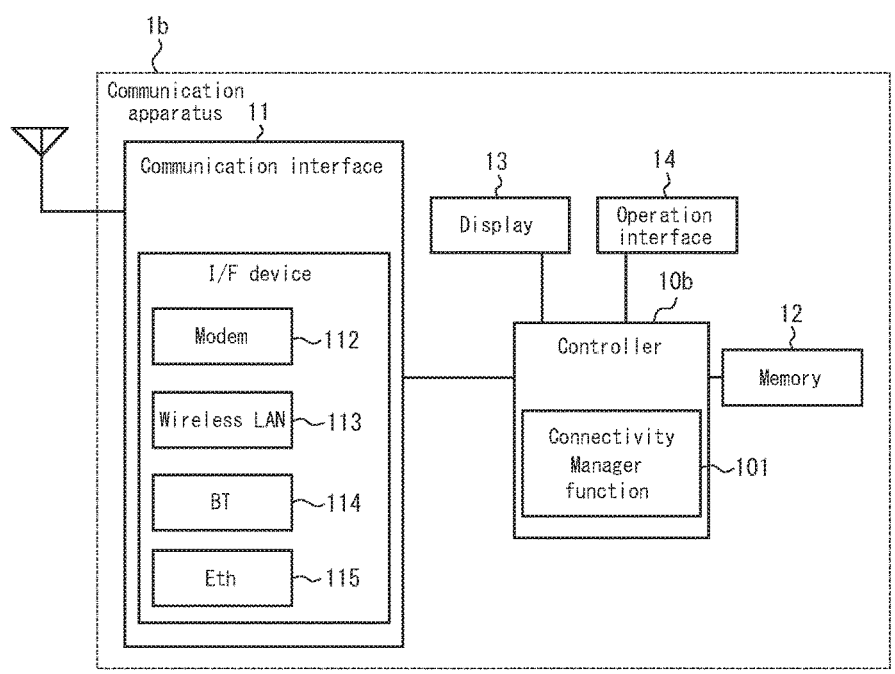
FIG. 7 is a functional block diagram schematically illustrating an example of the structure of a communication apparatus according to Embodiment 2.

FIG. 7 is a block diagram illustrating the structure of a communication apparatus 1b in Embodiment 2. In the communication apparatus 1b according to Embodiment 2, a controller 10b is provided with a Connectivity Manager function 101. Only the modem 112 and the wireless LAN device 113 are provided as examples of the I/F device 111b in Embodiment 1, but in Embodiment 2, a BT device 114 and an Eth device 115 are also provided. The BT device 114 is a device for BT communication, and the Eth device 115 is a device for Eth communication. Where the structure is the same as in Embodiment 1, the same reference signs are applied, and a description thereof is omitted. The Connectivity Manager function 101 performs data communication with a plurality of communication methods and selects the optimal communication method. The communication apparatus 1b then communicates with the selected optimal communication method. The following describes the Connectivity Manager function 101 in detail.

Figure 8:
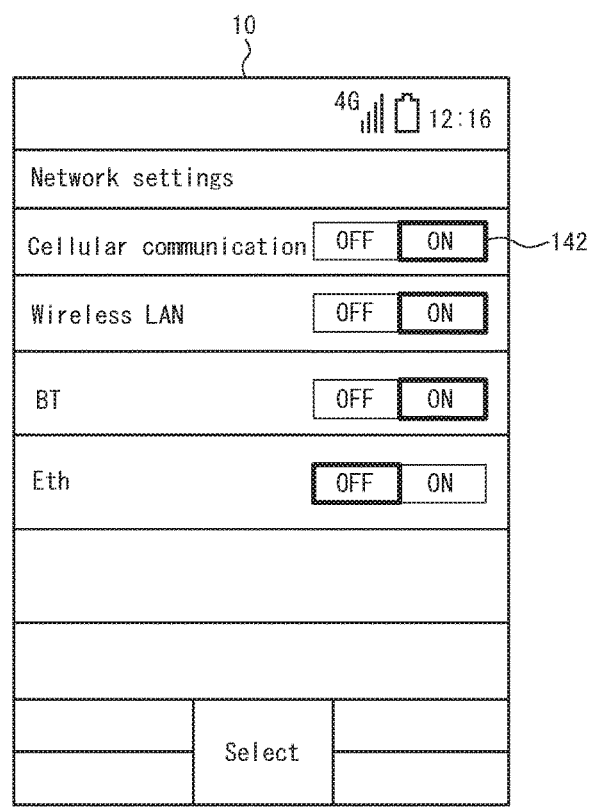
FIG. 8 is an example of an ON/OFF switching screen for each communication method.

The Connectivity Manager function 101 selects the optimal communication method from among communication methods that are on among the communication methods using each device (modem 112, wireless LAN device 113, BT device 114, Eth device 115). The user can select to switch the communication method that uses each device ON/OFF. FIG. 8 is an example of an ON/OFF switching screen for each communication method. The switching screen is displayed on the display 13 of the communication apparatus 1b. The operation interface 14 receives a user operation on an ON/OFF button 142 displayed on the switching screen and switches each communication method ON/OFF. The controller 10b stores information pertaining to the ON/OFF status in the memory 12. FIG. 9 illustrates an example of information stored in the memory. In this example, cellular communication, wireless LAN, and BT are on, whereas Eth is off.

The Connectivity Manager function 101 executes processing for scoring each communication method. This processing for scoring is executed by a Connectivity Check function of the Connectivity Manager function 101. In greater detail, when the communication status of the communication apparatus 1b changes, the Connectivity Manager function 101 transmits a predetermined volume of packets using the device for each of the communication methods that is set to be on (in the example in FIG. 9, the modem 112, wireless LAN device 113, and BT device 114). The Connectivity Manager function 101 evaluates the quality of each communication to calculate the score of the communication method. Next, the Connectivity Manager function 101 stores the calculated score in the memory 12. FIG. 10 illustrates an example of information pertaining to the score. In the example illustrated in FIG. 10, the score for cellular communication is the highest at 100. Therefore, the Connectivity Manager function 101 selects cellular communication as the optimal communication method. The communication apparatus 1b then communicates by cellular communication, which is the selected communication method.

In order to reduce the amount of communication during scoring by the Connectivity Manager function 101, when cellular communication is on, the controller 10b regulates data communication even if the UID of the request for data communication is the UID of the Connectivity Manager function 101. In greater detail, when the UID of the request for data communication is the UID (1000) of the Connectivity Manager function 101, the controller 10b performs scoring by transmitting a predetermined volume of packets for the communication methods other than cellular communication. For cellular communication, however, the controller 10b determines the score without transmitting packets. In greater detail, the score for cellular communication is set to a fixed value. In other words, the controller 10b sets the score for cellular communication to a fixed value without performing cellular communication during scoring and uses this fixed value for a comparison with the score of other communication methods to select a communication method.

In this way, in Embodiment 2, the Connectivity Manager function 101 does not perform cellular communication during scoring, thus allowing communication by cellular communication to be suppressed. Note that the Connectivity Manager function 101 is allocated a fixed UID (1000) by system communication.

Figure 11:
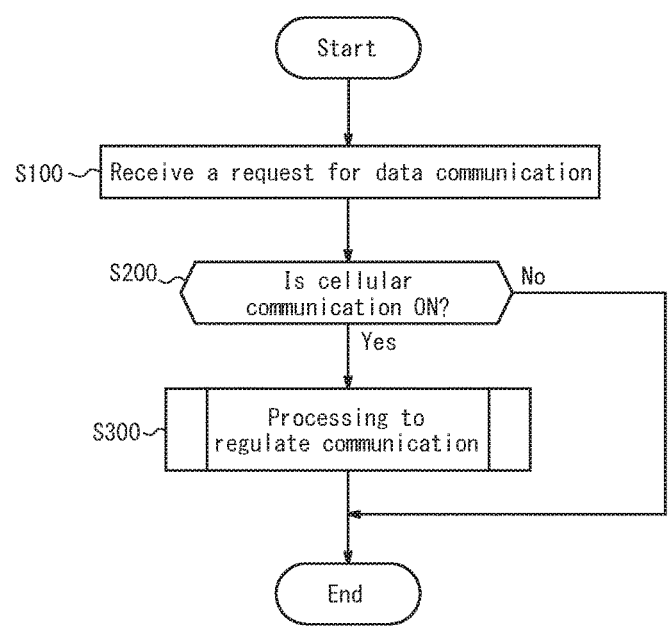
FIG. 11 is a flowchart schematically illustrating operations when the communication apparatus according to Embodiment 2 receives a communication request.
Figure 12:
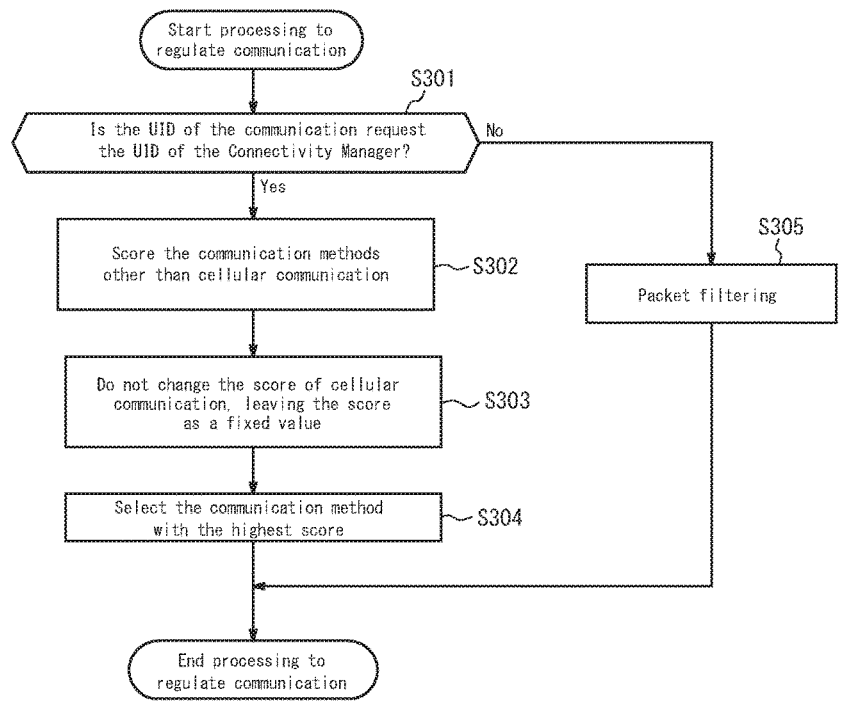
FIG. 12 is a flowchart illustrating the content of processing to regulate communication.

With reference to the flowcharts in FIG. 11 and FIG. 12, the operations of the communication apparatus 1b according to Embodiment 2 are now described. FIG. 11 is a flowchart schematically illustrating operations when the communication apparatus 1b according to Embodiment 2 receives a communication request. First, the controller 10b of the communication apparatus 1b receives a request for data communication (step S100). Next, the controller 10b determines whether cellular communication is on (step S200). When cellular communication is on, the controller 10b executes processing to regulate communication (S300). Conversely, when cellular communication is off (step S200: No), the controller 10b skips processing to regulate communication.

FIG. 12 is a flowchart illustrating the content of processing to regulate communication in step S300. First, the controller 10b determines whether the UID of the communication request is the UID of the Connectivity Manager function 101 (step S301). When the UID of the communication request is the UID of the Connectivity Manager function 101, the controller 10b uses the Connectivity Manager function 101 to score the communication methods other than cellular communication (step S302). The controller 10b does not change the score of cellular communication, leaving the score as a fixed value (step S303). The controller 10b then selects the communication method with the highest score (step S304), and the processing to regulate communication terminates.

On the other hand, when the UID of the request for communication in step S301 is not the UID of the Connectivity Manager function 101, the controller 10b performs packet filtering (step S305). That is, as illustrated in Embodiment 1, the controller 10b regulates communication by permitting only communication by an application with an explicitly permitted UID.

In this way, upon receiving a request for data communication when cellular communication is on, the communication apparatus 1b according to Embodiment 2 regulates data communication even when the UID of the request for data communication is the UID of the Connectivity Manager function 101. Therefore, an increase in the amount of communication due to the Connectivity Manager function 101 can be suppressed.

When the communication method being used is cellular communication by user designation, cellular communication may be selected regardless of the score for other communication methods. In this way, cellular communication can be selected when the user wishes to use cellular communication, thereby improving user-friendliness.

In step S305, communication is regulated to permit only communication by an application with an explicitly permitted UID, but this example is not limiting. Any other type of packet filtering may be performed. For example, as illustrated in the Comparative Example of Embodiment 1, communication may be regulated to prohibit only communication by an application with an explicitly prohibited UID.

A computer may suitably be used to function as the communication apparatus 1 or the communication apparatus 1b. Such a computer may be implemented by storing a program containing a description of the processing for achieving the functions of the communication apparatus 1 or the communication apparatus 1b in the memory of the computer, and having the central processing unit (CPU) of the computer read and execute the program.

The communication apparatus, communication control method, and non-transitory computer-readable recording medium according to embodiments of this disclosure can reduce the amount of data generated by data communication not intended by the user.

Although exemplary embodiments have been described with reference to the accompanying drawings, it is to be noted that various changes and modifications will be apparent to those skilled in the art based on this disclosure. Therefore, such changes and modifications are to be understood as included within the scope of this disclosure. For example, the functions and the like included in the various units and steps may be reordered in any logically consistent way. Furthermore, units and steps may be combined into one or divided.

In the above embodiments, wireless LAN has been provided as an example of a data communication method that is not a pay-as-you-go method, but this example is not limiting. Other data communication methods that are not pay-as-you-go methods include Bluetooth® and Ethernet®.

The invention claimed is:
1. A communication apparatus comprising:
a controller provided with a Connectivity Manager function configured to perform data communication with a plurality of communication methods and select an optimal communication method, wherein the controller is configured to
receive a request for data communication; and
regulate the data communication, when the request is received while cellular communication is on, even when a unique user identifier (UID) of the request is a UID of the Connectivity Manager function, so as to prevent cellular communication by the Connectivity Manager function.

2. The communication apparatus of claim 1, wherein the Connectivity Manager function selects the optimal communication method based on scoring of the communication methods but does not score the cellular communication.

3. The communication apparatus of claim 2, wherein the Connectivity Manager function sets a score of the cellular communication to a fixed value.

4. The communication apparatus of claim 3, wherein when a communication method to be used is designated by a user as the cellular communication, the Connectivity Manager function selects the cellular communication regardless of a score of other communication methods.

5. The communication apparatus of claim 2, wherein when a communication method to be used is designated by a user as the cellular communication, the Connectivity Manager function selects the cellular communication regardless of a score of other communication methods.

6. The communication apparatus of claim 1, wherein when a communication method to be used is designated by a user as the cellular communication, the Connectivity Manager function selects the cellular communication regardless of a score of other communication methods.

7. The communication apparatus of claim 1, where the controller is further configured to regulate the data communication by permitting only communication by an application with an explicitly permitted UID.

8. The communication apparatus of claim 1, where the controller is further configured to regulate the data communication by prohibiting communication by an application with an explicitly prohibited UID.

9. A communication control method comprising:
on a communication apparatus provided with a Connectivity Manager function configured to perform data communication with a plurality of communication methods and select an optimal communication method,
receiving a request for data communication; and
regulating the data communication when the request is received while cellular communication is on, even when a unique user identifier (UID) of the request is a UID of the Connectivity Manager function, so as to prevent cellular communication by the Connectivity Manager function.

10. The communication control method of claim 9, further comprising:
the Connectivity Manager function selecting the optimal communication method based on scoring of the communication methods but does not score the cellular communication.

11. The communication control method of claim 10, further comprising:
the Connectivity Manager function setting a score of the cellular communication to a fixed value.

12. The communication control method of claim 11, further comprising:
when a communication method to be used is designated by a user as the cellular communication, the Connectivity Manager function selecting the cellular communication regardless of a score of other communication methods.

13. The communication control method of claim 10, further comprising:
when a communication method to be used is designated by a user as the cellular communication, the Connectivity Manager function selecting the cellular communication regardless of a score of other communication methods.

14. The communication control method of claim 9, further comprising:
when a communication method to be used is designated by a user as the cellular communication, the Connectivity Manager function selecting the cellular communication regardless of a score of other communication methods.

15. A non-transitory computer-readable recording medium including computer program instructions to be executed by a computer functioning as a communication apparatus,
the communication apparatus provided with a Connectivity Manager function configured to perform data communication with a plurality of communication methods and select an optimal communication method,
the instructions causing the computer to:
receive a request for data communication; and
regulate the data communication when the request is received while cellular communication is on, even when a unique user identifier (UID) of the request is a UID of the Connectivity Manager function, so as to prevent cellular communication by the Connectivity Manager function.

16. The non-transitory computer-readable recording medium of claim 15, wherein the instructions further cause the computer to:
as the Connectivity Manager function,
select the optimal communication method based on scoring of the communication methods but does not score the cellular communication.

17. The non-transitory computer-readable recording medium of claim 16, wherein the instructions further cause the computer to:
as the Connectivity Manager function,
set a score of the cellular communication to a fixed value.

18. The non-transitory computer-readable recording medium of claim 17, wherein the instructions further causing the computer to:
as the Connectivity Manager function,
when a communication method to be used is designated by a user as the cellular communication, select the cellular communication regardless of a score of other communication methods.

19. The non-transitory computer-readable recording medium of claim 16, wherein the instructions further causing the computer to:
as the Connectivity Manager function,
when a communication method to be used is designated by a user as the cellular communication, select the cellular communication regardless of a score of other communication methods.

20. The non-transitory computer-readable recording medium of claim 15, wherein the instructions further causing the computer to:
as the Connectivity Manager function, when a communication method to be used is designated by a user as the cellular communication, select the cellular communication regardless of a score of other communication methods.

* * * * *